United States Patent
Liebert et al.

(10) Patent No.: US 8,204,223 B1
(45) Date of Patent: *Jun. 19, 2012

(54) SYSTEM PROVIDING DYNAMIC QUALITY OF SERVICE SIGNALING MESSAGES IN A CABLE TELEPHONY NETWORK

(75) Inventors: Thomas A. Liebert, Middletown, NJ (US); Steven M. Michelson, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 208 days.

This patent is subject to a terminal disclaimer.

(21) Appl. No.: 12/589,232

(22) Filed: Oct. 20, 2009

Related U.S. Application Data

(63) Continuation of application No. 11/412,646, filed on Apr. 27, 2006, now Pat. No. 7,623,664, which is a continuation of application No. 09/840,492, filed on Apr. 23, 2001, now Pat. No. 7,080,248.

(51) Int. Cl.
*H04K 1/00* (2006.01)
(52) U.S. Cl. .................................................. 380/257
(58) Field of Classification Search ............ 380/257, 380/255; 713/153, 169
See application file for complete search history.

(56) References Cited

U.S. PATENT DOCUMENTS

| | | | | |
|---|---|---|---|---|
| 6,028,933 A | * | 2/2000 | Heer et al. | 713/169 |
| 6,438,123 B1 | * | 8/2002 | Chapman | 370/351 |
| 6,483,912 B1 | * | 11/2002 | Kalmanek et al. | 379/219 |

* cited by examiner

*Primary Examiner* — Samson Lemma

(57) ABSTRACT

A system of Quality of Service signaling in an IP cable telephony system includes encrypting Quality of Service signals and sending them, instead of directly from an Internet Protocol Digital Terminal to a Cable Modem Termination System, indirectly via Broadband Telephony Interface serving a telephony device. The Broadband Telephony Interface, which lacks the encryption and decryption keys, includes the encrypted Quality of Service signaling message in a signaling message it transmits to the Cable Modem Termination System when requesting a change in access to network resources. The Cable Modem Termination System attempts to decrypt the Quality of Service signaling message; and it controls access to network resources in accordance with the contents of the Quality of Service signaling message if it is able to decrypt it. This system reduces the number of signaling messages and network resources needed for call processing while providing security against denial-of-service attacks.

16 Claims, 4 Drawing Sheets

SYSTEM PROVIDING DYNAMIC QUALITY OF SERVICE SIGNALING MESSAGES IN A CABLE TELEPHONY NETWORK

CROSS REFERENCE TO RELATED APPLICATIONS

This application is a continuation of U.S. application Ser. No. 11/412,646, entitled "System Providing Dynamic Quality of Service Signaling Messages in a Cable Telephony Network," filed Apr. 27, 2006, which issued on Nov. 24, 2009 as U.S. Pat. No. 7,623,664; which is a continuation of application Ser. No. 09/840,492, entitled "System Providing Dynamic Quality of Service Signaling Messages in a Cable Telephony Network," filed Apr. 23, 2001, which issued on Jul. 18, 2006 as U.S. Pat. No. 7,080,248.

FIELD OF THE INVENTION

This invention relates to telephony networks. More particularly, this invention relates to telephony networks in which the communication between a telephone and the public switched telephone network includes transport of data packets over cable television network facilities. The present invention provides more efficient and secure call setup signaling in such networks.

BACKGROUND OF THE INVENTION

For many years the public switched telephone network was the only generally available medium for telecommunications. It was originally designed solely for voice communications; but because it was widely available, it became used for other types of communications such as data communications. In recent years, other types of telecommunication media have been deployed. If a telecommunication media is capable of carrying voice signals, it may be desirable to interface it with the public switched telephone network and use it to carry telephone calls.

Two telecommunication media that have proliferated in recent years are the Internet and the networks used for cable television. Cable television networks often use coaxial cable to carry broadband radio frequency signals between a hub and a number of customer homes, and optical fibers to carry optical signals between the hub and a "head end"; these networks are sometimes referred to as broadband networks or "hybrid fiber coax" (HFC) networks. These networks have been equipped with the capability of upstream and downstream digital data communications to facilitate remote programming and control of customer cable boxes, customer selection of programming, and the like. Cable television providers have begun to adapt their networks so that their customers can access the Internet through a cable modem connected to the coaxial cable that brings cable television signals to the customers. As will be described more fully with respect to FIG. 1, prior art systems for providing Internet access through a cable television network include a cable modem (or "CM") at the customer's premises that interfaces data processing equipment, such as a computer, to the cable television coaxial cable. A device typically located at a cable head-end sends signals to and receives signals from digital data signals with a number of cable modems and interfaces such signals to an Internet Protocol (IP) network. That device may be referred to as a "Cable Modem Termination System" or "CMTS"; if provided with router functionality, such a device may be referred to as a Cable Modem Termination System/Edge Router or "CMTS/ER". A cable company's HFC network may include a number of CMTS/ERs, each of which serves a different group of customers.

Systems have also been developed to enable telephone handsets or other telephony devices at a customer's premises to be connected via the HFC network to the public switched telephone network so that telephone calls can be made using the HFC network instead of using the twisted-pair customer loops provided by a local telephone company. One way to accomplish this is to carry the voice over IP packets between a "Broadband Telephony Interface" or "BTI" and the CMTS/ER, then to convert the packets to a TDM bit stream that interfaces to a class 5 switch via a GR-303 interface.

As will be described more fully with respect to FIG. 1, cable telephony systems include a device at the customer's premises that interfaces voice equipment, such as a telephone handset, to the cable television coaxial cable and implements the processing and signaling functions required for telephony over the cable; this device may be referred to as a "Broadband Telephony Interface" or "BTI". In order to connect telephony signals in the HFC network to the public switched telephone network, a device that may be referred to as an "Internet Protocol Digital Terminal" or "IPDT" may be connected to the IP network (to send signals to and receive signals from a CMTS/ER) and to a telephone company's Local Digital Switch (or "LDS"), a local Class 5 switch.

An important aspect of implementing telephony over a packet data network is Quality of Service, or QoS. Voice calls take place in real time; and when setting them up and conducting them, enough bandwidth on the network must be made available to the call to permit conversations to take place with substantially the same speech quality and immediacy that the public switched telephone network provides. Bandwidth is allocated and reserved in a network by QoS signaling; and if done on a per-call basis, it is referred to as Dynamic Quality of Service, or DQoS, and is implemented by DQoS signaling.

As will be described more fully with respect to FIG. 2, the existing systems of DQoS signaling used to set up calls in prior art cable telephony systems have several drawbacks. One drawback is the necessity for the IPDT, upon receipt of a call intended for a cable-telephony customer, to determine which CMTS/ER services that customer so that call setup signaling messages can be sent to the proper CMTS/ER. This requires providing a database that can be accessed and imposes on each call the burden of performing a database access, which is typically performed by the IPDT. This aspect of the prior art system also poses problems in keeping the database current, because the assignment of customers to particular CMTS/ERs may be changed from time to time to optimize the network. Another drawback of prior art systems is the number of signaling messages that must be transmitted among network devices for call setup; these signaling messages impose a burden on network resources and introduce additional call setup delay. In order to avoid these drawbacks, prior art signaling systems may omit DQoS signaling and simply grant service whenever it is requested, but systems that omit DQoS signaling are vulnerable to denial-of-service attacks, which fraudulently tie up extensive network resources and make them unavailable to legitimate paying customers.

It is therefore a general object of the present invention to provide a telephony system that avoids the aforementioned drawbacks of the prior art. More particularly, the present invention is intended to provide the network security of DQoS signaling while providing simplified and shorter call setup with respect to the DQoS signaling systems of prior art cable telephony systems.

BRIEF SUMMARY OF THE INVENTION

In accordance with the present invention, in a cable telephony system, during call setup an IPDT sends a signaling message to the BTI that services the telephony device involved in the call. This signaling message includes an encrypted DQoS signaling message intended for the CMTS/ER. The BTI encapsulates the encrypted DQoS signaling message in a signaling message it sends to the CMTS/ER to request network resources for the call. The CMTS/ER is provided with a decryption key and attempts to decrypt the DQoS signaling message it receives from the BTI. Further call setup is dependent upon the results of the decryption attempt. As will be explained more fully after a more detailed description of the invention, these features provide security against denial-of-service attacks by making it difficult for a hacker or a hacked device to acquire and tie up network resources, and they enable a simplified system of signaling that reduces call setup delay and the network resources required for call setup compared to existing DQoS signaling systems.

These and other objects and features of the present invention are set forth in greater detail in the following description and the drawings.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

DETAILED DESCRIPTION OF THE INVENTION

Figure 1:
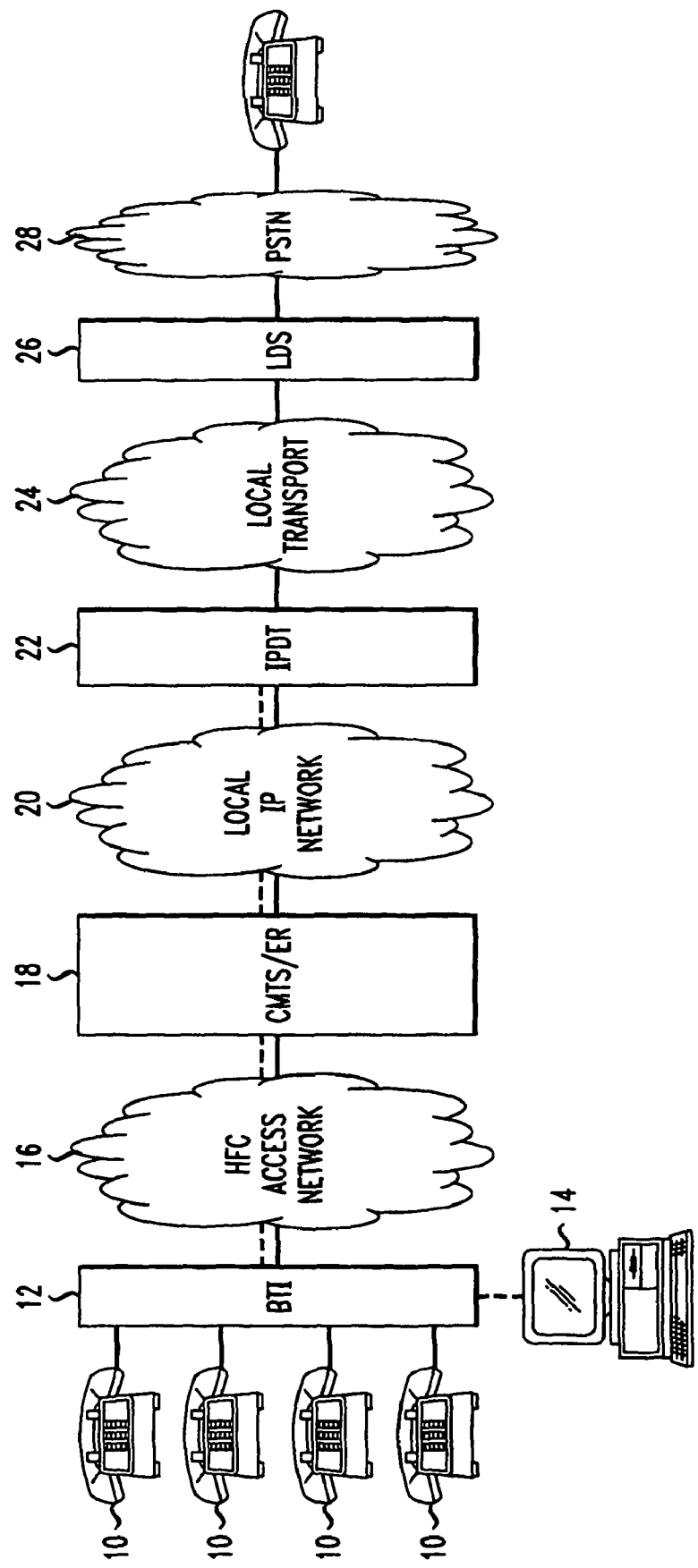
FIG. 1 is a schematic diagram of a cable telephony system.

FIG. 1 is a schematic diagram of a cable telephony system. FIG. 1 per se is part of the prior art; it illustrates the general features of a cable telephony system that may exist in a prior art system. The terminology used to describe the network elements includes standard terminology such as is used in PacketCable™ specifications generated for the cable television industry by Cable Television Laboratories, Inc. (CableLabs).

The network elements illustrated in FIG. 1 will generally communicate using standard protocols. For instance, in the IP portion of the network, DOCSIS (Data Over Cable System Interface Specification) will be used in signaling over the HFC network between the BTI and the CMTS/ER; signaling messages between the IPDT and the BTI may use the Network-based Call Signaling (NCS) protocol; and signaling messages between the IPDT and the LDS may use GR-303 protocol, in which the IPDT functions as a Remote Digital Terminal under that protocol. Voice and the like are transmitted between network elements using Real Time Protocol (RTP).

A Broadband Telephony Interface (BTI) 12 (which includes, in CableLabs terminology, a Multimedia Terminal Adapter (MTA) function) in a customer's premises provides the interface between the customer's analog telephony devices (e.g., phones, modems, and fax machines) and the HFC access network supporting data communications (using a protocol such as DOCSIS) to enable cable IP telephony service. The BTI 12 digitizes the analog telephony signals (using a coding scheme such as G.711) and packetizes them into IP packets. These IP packets are then encapsulated into DOCSIS frames for transmission over the HFC network. The BTI 12 may service several telephony devices such as telephones 10. The BTI 12 may be integrated with a DOCSIS-compliant cable modem to provide both high-speed data access for a computer 14 and cable telephony access for telephony devices 10.

The HFC network 16 is used to connect BTI 12 to a telephony-ready CMTS/ER 18 (e.g., a CMTS/ER that supports dynamic QoS). This network typically is comprised of standard two-way cable plant elements with at least one downstream RF channel and several upstream RF channels designated for IP services. The CMTS/ER 18 terminates the upstream channels, originates the downstream channel used for IP services, and provides an interface between the HFC network 16 and a local IP network 20.

IPDT 22 provides access to the public switched telephone network 28 for cable telephony calls. In PacketCable terminology, IPDT 22 functions as a Call Management Server (CMS) or Call Agent (CA). IPDT 22 provides an interface, such as a GR-303 interface, to a Local Digital Switch (LDS) 26 on its public switched telephone network side, and an IP interface on its IP network side. IPDT 22 provides inter-working between the IP packet network 20 and the public switched telephone network 28 through local transport 24. Call set-up and tear-down between the BTI 12 and the IPDT 22 is facilitated through the exchange of NCS signaling messages and additional information carried in the RTP stream between them. IPDT 22 may use Robbed Bit Signaling on the GR-303 interface and inter-working ABCD bits on the GR-303 side and the Real Time Protocol (RTP) stream on the IP side. This allows events (e.g., on-hook and off-hook events) received via the RTP stream from the Broadband Telephony Interface 12 to be mapped into ABCD signaling bits on a DS0 channel to the LDS 26, and the power ringing event (ABCD bits) received by the IPDT 22 on the DS0 channel from the LDS 26 to be mapped into the RTP stream toward the BTI 12.

Figure 2:
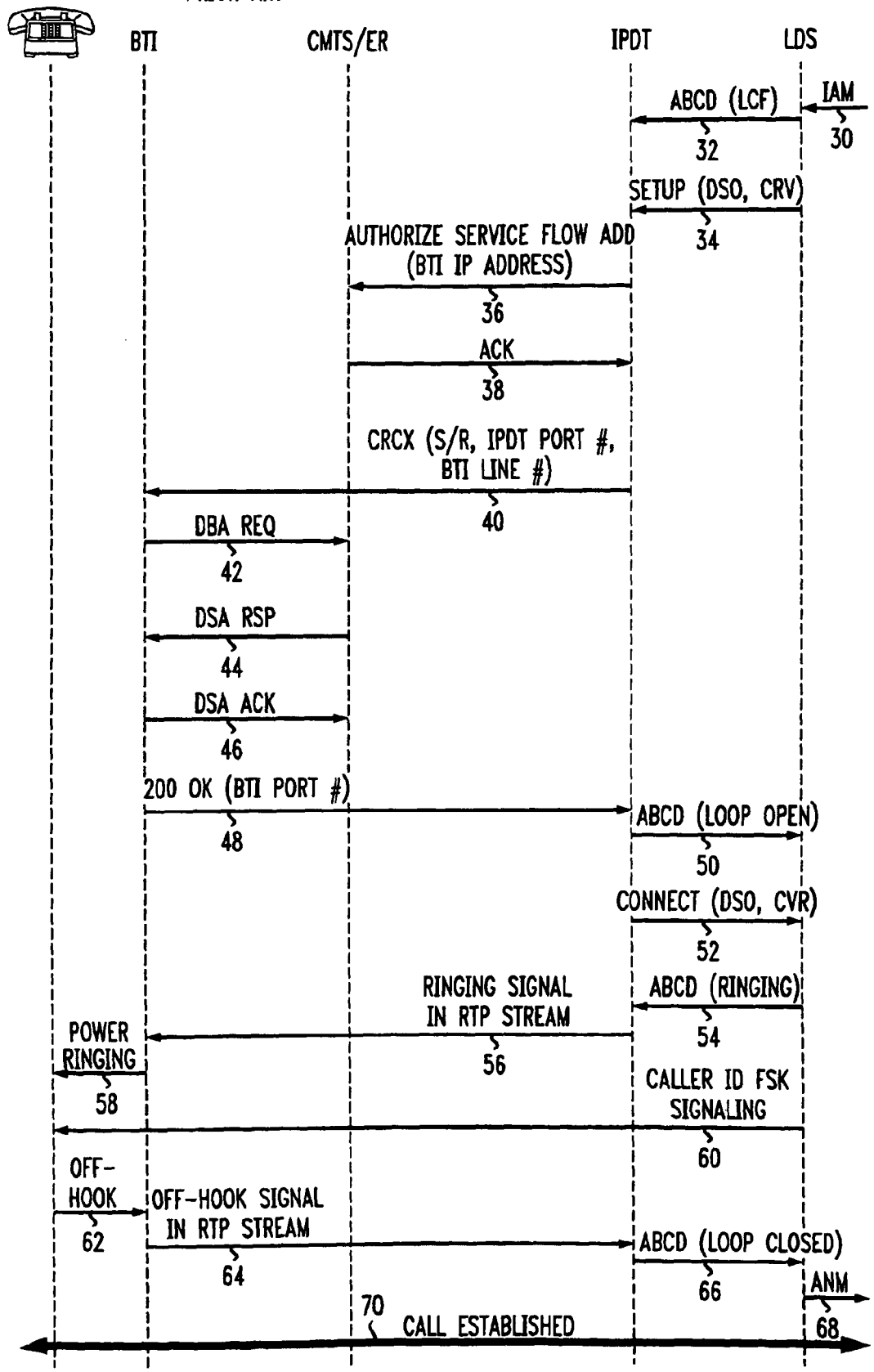
FIG. 2 is a schematic diagram of a prior art signaling system used for setup of an incoming telephone call in the telephony-over-cable system of FIG. 1.

FIG. 2 is a flow diagram of a prior art signaling system used for setup of an incoming telephone call in the cable telephony system of FIG. 1. FIG. 2 shows, from top to bottom, the sequence and flow of signaling messages transmitted between the network elements shown in FIG. 1 for a call arriving from the public switched telephone network 28 that is destined for a cable telephony customer. In the following description, messages exchanged between the BTI 12 and the CMTS/ER are DOCSIS messages; those exchanged between the BTI 12 and the IPDT 22 are NCS-based messages or embedded signals in the RTP stream; those exchanged between the IPDT 22 and the LDS 26 are GR-303 messages; and those exchanged between the LDS 26 and other public switched telephone network switches are SS7 ISUP messages. The IPDT may support the TMC procedures of the GR-303 interface, which uses a hybrid signaling format. Once a time-slot has been assigned for a call, call supervision is achieved via "ABCD" codes sent using robbed-bit signaling. The ABCD codes on the GR-303 interface are transmitted between the IPDT and the BTI in the RTP stream, thereby providing a transparent path for call supervision between the BTI and the LDS. In FIG. 2, the step numbers used in the following discussion are indicated at the left and right sides of the drawing flanking the step to which they relate. For simplicity in the following discussion, the numerical references to the network elements are omitted.

The process begins in step 30 when an LDS receives an SS7 IAM Initial Address Message indicating an incoming call intended for a cable telephony customer. The LDS determines the Interface Group and Call Reference Value (CRV) corresponding to the received Called Party Number. In step 32 the LDS notifies the IPDT that it wishes to initiate a call over this Interface Group (using GR-303 TMC signaling), selects an idle DS0 and in step 34 notifies the IPDT which DS0 will be used for this call (via a SETUP message). On receipt of the SETUP message, the IPDT determines the IP address currently being used by the called party's BTL. Once the IPDT has determined the IP address of the called party's BTI, in step 36 the IPDT authorizes the CMTS to accept a bandwidth request from the BTI (via an Authorize Service Flow Add message). The CMTS reserves the necessary bandwidth and in step 38 acknowledges this authorization (via an ACK message to the IPDT). Upon receipt of the acknowledgment from the CMTS, in step 40 the IPDT requests the BTI to create a connection (via a CRCX message). Included in this request is the BTI line number to which the call is destined. On receipt of the request to create a connection, in step 42 the BTI requests the CMTS to provide resources (i.e., bandwidth) for this call via a DOCSIS DSA-REQ message. If the requested bandwidth is granted by the CMTS, which is indicated in a DSA-RSP message in step 44 that is acknowledged in step 46, the BTI in step 48 informs the IPDT which BTI port number will be used for this call (via a 200 OK message). A media path (RTP stream) is now established between the assigned ports on the IPDT and the BTI. Once the IPDT knows that the BTI has been allocated bandwidth for the call, the IPDT in step 50 signals to the LDS that the called party is on-hook (using GR-303 TMC signaling) and in step 52 confirms the DS0 assignment (via a CONNECT message). Upon notification that the called party is on-hook, the LDS in step 54 instructs the IPDT to "ring" the called party's telephone line (using GR-303 TMC signaling). In step 56 the IPDT passes the ringing instruction (and ringing pattern) to the BTI in-band. On receipt of the ringing instruction, in step 58 the BTI applies power ringing on the line associated with the called number. If the cable telephony customer has subscribed to any of the Caller ID features, in step 60 the caller's telephone number and/or name will be sent by the LDS in-band via FSK signaling. Upon detection of the off-hook event (step 62) occurring when the called party answers the telephone, the BTI stops power ringing and in step 64 notifies the IPDT by transmitting an off-hook signal in the RTP stream. The IPDT in turn notifies the LDS in step 66 (via GR-303 TMC signaling), which in step 68 sends an SS7 ANM answer message over the SS7 network to the originating switch. A two-way, end-to-end call path is now established in step 70 and conversation can commence.

The foregoing describes the complete call flow for an incoming call. However, it is a particular part of this flow, the DQoS signaling, to which the present invention relates. Notice that in the signaling message flow of FIG. 2, before the IPDT sends a CRCX message (or a DLCX message in an analogous call teardown flow) to the BTI, the IPDT first sends a message to the CMTS/ER authorizing it to respond appropriately to the DSA-REQ (or DSD-REQ request in teardown) that it is about to receive from a specific BTI. This IPDT-to-CMTS/ER exchange ensures that QoS assurances made by the network are under the control of the IPDT, which can use a variety of criteria (including network capacity, account history, etc.) to determine whether to allow the BTI to have a guaranteed QoS for a particular call. After sending the message to the CMTS/ER, the IPDT sends the CRCX (or DLCX) message to the BTI, telling it to set up (or tear down) a voice connection between one of the telephone lines terminating on the BTI and a port on the IPDT. In response to this message, the BTI sends the DSA-REQ (or DSD-REQ) message to the CMTS/ER. The messages sent from the IPDT to the CMTS/ER (i.e. the "Authorize Service Flow Add" and the "Authorize Service Flow Delete" messages), and the corresponding ACK messages sent in reply from the CMTS/ER to the IPDT, are DQoS messages. These are the only messages that require the IPDT to know which CMTS/ER supports a specific BTI. No other messages are sent from the IPDT to the CMTS/ER. In order for the IPDT to determine to which CMTS the message should be sent, information mapping the BTI to its associated CMTS needs to be accessed by the IPDT at call setup time. Alternatively, DQoS signaling may be omitted and the CMTS/ER may simply "trust" the BTI on the customer premises and respond to the DSA-REQ and DSD-REQ messages from the BTI without the explicit authorization from the IPDT that DQoS signaling would provide. This alternative approach makes the service vulnerable to denial-of-service attacks in which computers (or "hacked" BTIs), posing as legitimate BTIs, request large amounts of bandwidth without releasing it, thereby making the bandwidth unavailable to other customers.

Figure 3:
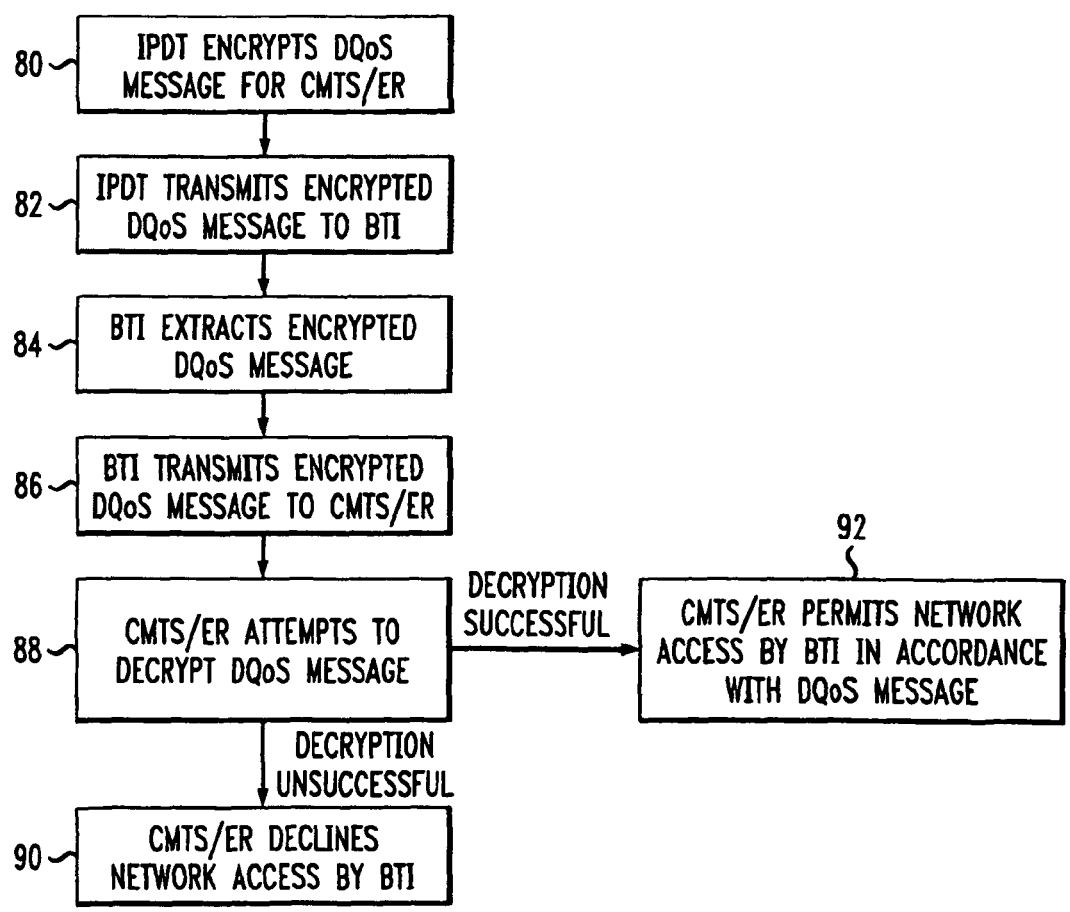
FIG. 3 is a flow diagram illustrating the basic elements of the signaling system of the present invention.

In accordance with the present invention, DQoS is implemented in a way that does not require the IPDT to send DQoS messages directly to a CMTS/ER, resulting in faster call setup and teardown. Instead, the network and its elements implement the method shown in the flow diagram of FIG. 3. As shown in FIG. 3, in step 80 the IPDT encrypts a DQoS message intended for the CMTS/ER and in step 82 the IPDT encapsulates the encrypted DQoS message inside the NCS message (CRCX or DLCX) that the IPDT sends to the BTI. In step 84 the BTI extracts the encrypted message but, because it lacks the decryption key, the BTI cannot read or alter it. When in step 86 the BTI sends the corresponding DSA-REQ or DSD-REQ DOCSIS message to the CMTS/ER, it encapsulates, in that message, the extracted encrypted DQoS message. Upon receipt of the DOCSIS message from the BTI, in step 88 the CMTS/ER attempts to decrypt the embedded, encrypted DQoS message. If the decryption attempt is unsuccessful, in step 90 the CMTS/ER declines the requested network access. If the decryption attempt is successful, in step 92 the CMTS/ER determines whether the requested network access is authorized by the IPDT and, if so, the QoS level authorized by the IPDT.

Figure 4:
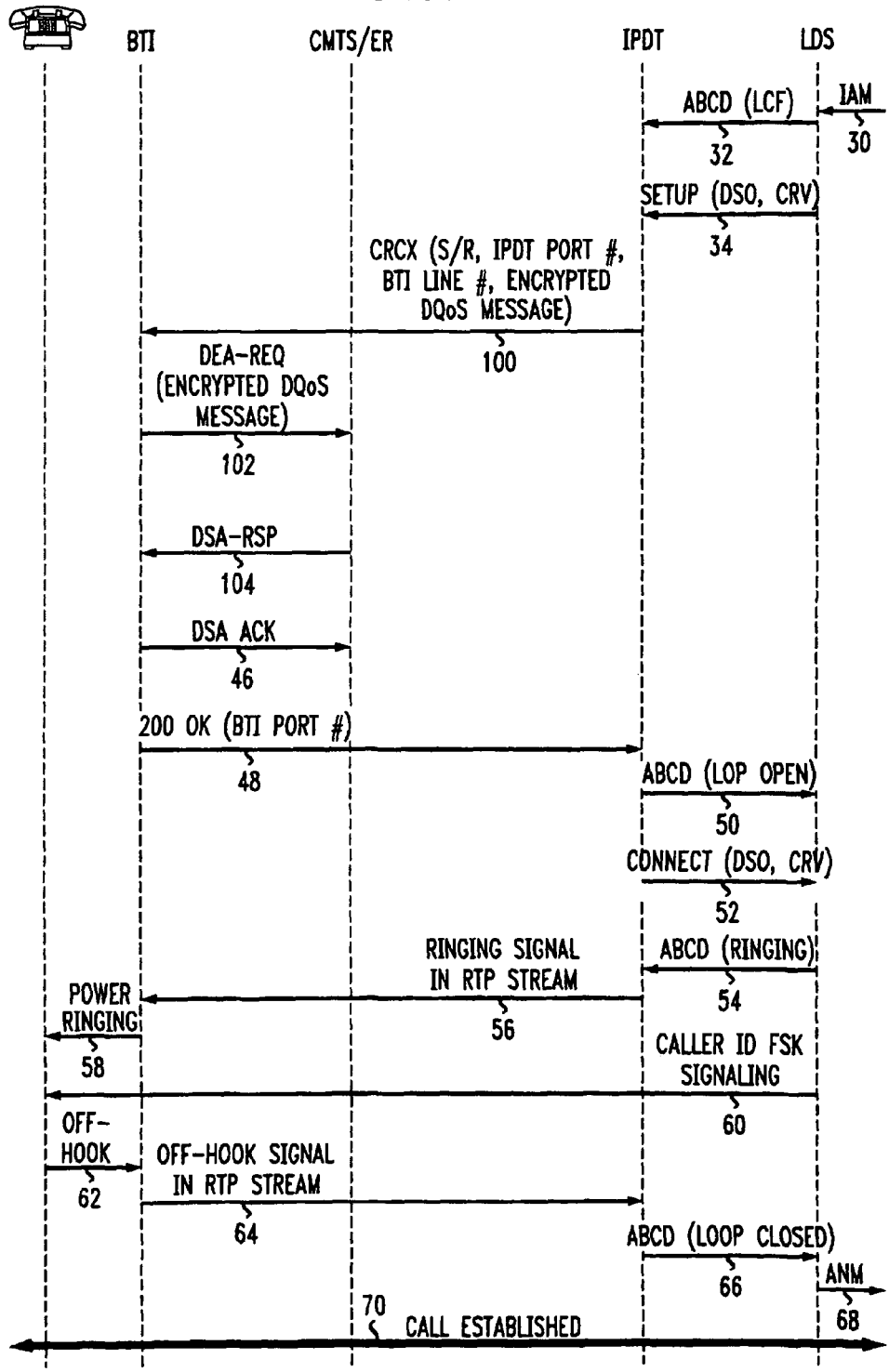
FIG. 4 is a schematic diagram showing a preferred embodiment of the signaling system used for setup of an incoming telephone call in accordance with the present invention.

FIG. 4 is a flow diagram of a signaling system in accordance with the present invention used for setup of an incoming telephone call in the cable telephony system of FIG. 1. FIG. 4 is a modification of the flow diagram of FIG. 2 that includes steps shown in FIG. 3 and shows, from top to bottom, the sequence and flow of signaling messages transmitted between the network elements shown in FIG. 1 for a call arriving from the public switched telephone network 28 that is destined for a cable telephony customer. In FIG. 4, steps that are identical to those of FIG. 2 are indicated by the same reference numbers.

The call flow of FIG. 4 omits the signaling messages between the IPDT and the CMTS/ER designated as steps 36 and 38 in FIG. 2. Instead of the IPDT transmitting the DQoS message directly to the CMTS/ER, that message is transmitted indirectly, via the BTI. The CRCX message transmitted to the BTI in step 100 is modified from the CRCX message transmitted in step 40 of FIG. 2 by inclusion of an encrypted DQoS message intended for the CMTS/ER. The BTI extracts the encrypted DQoS message, which it includes in the DSA-REQ message it sends to the CMTS/ER in step 102. The CMTS/ER, using its decryption key, attempts to decrypt the encrypted DQoS message, and generates its response message DSA-RSP that it transmits to the BTI in step 104 in accordance with the results of its decryption attempt. The contents of the DSA-RSP message govern further handling of the call setup procedure. Successful decryption enables verification that the DSA-REQ (or a DSD-REQ) request was authorized by the IPDT. This method improves call setup by eliminating the need for the IPDT to determine which CMTS/ER supports the particular BTI involved in the call and by eliminating several signaling messages from the call flow.

An important aspect of the above-described method is security of the encryption and decryption keys. The method of the present invention is desirably implemented using public key cryptography. If so, it is important to ensure that all CMTS/ERs in the network are aware of the public key for decrypting the DQoS messages, and that all IPDTs in the network are aware of the private key for encrypting the DQoS messages. To prevent the public and private keys from being intercepted or derived by rogue BTIs, they must be periodically changed. The process of changing keys must ensure that 1) all CMTS/ERs in the network know which public key to use at a given point in time, and 2) all IPDTs in the network know which private key to use at a given point in time. Thus, the values must be synchronized among all applicable network elements. One method of accomplishing this is to distribute the keys to the IPDTs and the CMTS/ERs over a secure network, along with the time and date at which the changeover will occur. Another method of accomplishing this is to define an algorithm running in each IPDT and CMTS/ER and to start the algorithm with the same seed value at a synchronized point in time. In order to accommodate some imprecision in the synchronization of the clocks among all the IPDTs and CMTS/ERs, during a time window around the time of the changeover the CMTS/ER may attempt to decrypt the DQoS messages with the new key as well as the previous one. Once this window has passed, only the new key is used until the next one becomes valid.

An IPDT encrypts the DQoS message intended for the CMTS/ER using a private key that is common across the network to all IPDTs. The IPDT then embeds this encrypted DQoS message in the NCS CRCX (or DLCX) message that it sends to the BTI. The BTI extracts this encrypted DQoS message and embeds it in the DOCSIS DSA-REQ (or DSD-REQ) message that it sends to the CMTS/ER. The BTI cannot read or alter this message because the BTI doesn't know the IPDT's public or private key. The CMTS/ER uses the network-wide public key to decrypt the DQoS message and thereby to verify that the DSA-REQ (or DSD-REQ) was authorized by the IPDT. Once it verifies that the IPDT authorized a particular BTI request, the CMTS/ER grants the request of the BTI (with a DSA-RSP or DSD-RSP), and the BTI responds (1) to the CMTS/ER with a DOCSIS DSA-ACK (or DSD-ACK), and (2) to the IPDT with an NCS 200 OK message. When the IPDT receives the 200 OK message, it knows that the CRCX (or DLCX) request was completed successfully.

While particular embodiments of the invention have been described, variations no doubt will occur to those skilled in the art without departing from the spirit and scope of the invention. For instance, while the invention has been described with respect to hybrid fiber-coax networks, it should be understood that it is applicable to any similar data network access made available to users. For example, the invention may be used in connection with coax cable television networks and, as cable television providers extend their fiber channels into residences, in connection with such fiber cable television networks. Accordingly, the term "cable television network" as used herein is intended to embrace these and all such networks. Moreover, although the invention has been illustrated in connection with receipt of a call from the public switched telephone network intended for a cable telephony customer, it should be understood that the invention is applicable to other telephony processes, including initiation of a call by a cable telephony customer intended for the public switched telephone network and termination of calls.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An Internet protocol digital terminal system for providing access to a public switched telephone network by a cable telephony system using one or more packet data networks, comprising:
   an encryption function for encrypting a dynamic quality of service signaling message; and
   an Internet protocol digital terminal device comprising:
      a public switched telephone network side for providing a telephony interface and for receiving calls from the public switched telephone network, and
      an Internet protocol network side for providing an Internet protocol interface and for transmitting the encrypted dynamic quality of service signaling message to a broadband telephony interface.

2. The Internet protocol digital terminal system of claim 1, wherein the encrypted dynamic quality of service signaling message is for transmitting from the broadband telephony interface to a cable modem termination system.

3. The Internet protocol digital terminal system of claim 2, wherein the encryption function utilizes one of a public/private encryption key pair for which another of the pair is possessed by the cable modem termination system.

4. The Internet protocol digital terminal system of claim 1, wherein the Internet protocol interface of the Internet protocol network side is further for receiving an off-hook signal from the broadband telephony interface.

5. The Internet protocol digital terminal system of claim 4, wherein the telephony interface of the public switched telephone network side is further for notifying a local digital switch in the public switched telephone network of the off-hook signal.

6. A non-transitory computer readable or usable medium having computer readable instructions stored thereon for execution by a processor to perform a method of quality of service signaling in a system for cable telephony using one or more packet data networks, the method comprising:
   encrypting, at an Internet protocol digital terminal, a dynamic quality of service signaling message; and
   transmitting the encrypted dynamic quality of service signaling message to a broadband telephony interface.

7. The non-transitory computer readable or usable medium of claim 6, wherein the method further comprises:
   transmitting a signaling message including the encrypted dynamic quality of service signaling message from the broadband telephony interface to a cable modem termination system in connection with a request to change access by the broadband telephony interface to network resources.

8. The non-transitory computer readable or usable medium of claim 7, wherein the method further comprises:
- attempting to decrypt the encrypted dynamic quality of service signaling message in the cable modem termination system; and
- controlling access by the broadband telephony interface to network resources in accordance with the results of the decryption attempting.

9. A non-transitory computer readable or usable medium having computer readable instructions stored thereon for execution by a processor to perform a method of quality of service signaling in a system for cable telephony using one or more packet data networks, the method comprising:
- encrypting, at an Internet protocol digital terminal, a dynamic quality of service signaling message; and
- transmitting a signaling message including the encrypted dynamic quality of service signaling message to a broadband telephony interface.

10. The non-transitory computer readable or usable medium of claim 9, wherein the encrypted dynamic quality of service signaling message is part of a create connection or delete connection message.

11. The non-transitory computer readable or usable medium of claim 9, wherein the method further comprises:
- transmitting a signaling message including the encrypted dynamic quality of service signaling message from the broadband telephony interface to a cable modem termination system in connection with a request to change access by the broadband telephony interface to network resources.

12. The non-transitory computer readable or usable medium of claim 11, wherein the encrypted dynamic quality of service signaling message is part of a dynamic service addition request or dynamic service delete request message.

13. The non-transitory computer readable or usable medium of claim 11, further comprising:
- attempting to decrypt the encrypted dynamic quality of service signaling message in the cable modem termination system; and
- controlling access by the broadband telephony interface to network resources in accordance with the results of the attempting to decrypt.

14. The non-transitory computer readable or usable medium of claim 13, wherein
- the encrypting a dynamic quality of service signaling message utilizes one of a public/private encryption key pair; and
- the attempting to decrypt the encrypted dynamic quality of service signaling message in the cable modem termination system utilizes another of the public/private encryption pair.

15. The non-transitory computer readable or usable medium of claim 14, wherein the method further comprises distributing the keys via a secure communication channel.

16. The non-transitory computer readable or usable medium of claim 14, wherein the method further comprises generating the keys by operating on a seed value with an algorithm.

* * * * *